W. T. JAMES.
CHAIN.
APPLICATION FILED APR. 21, 1915.
1,235,321.
Patented July 31, 1917.
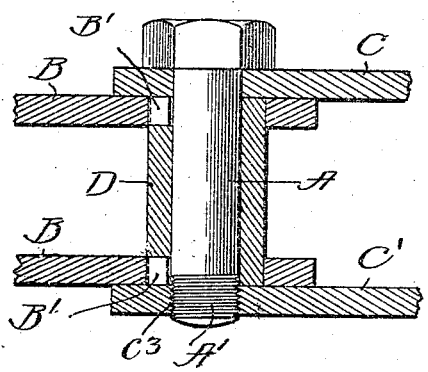
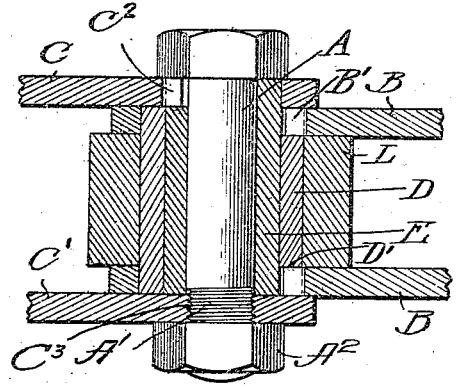
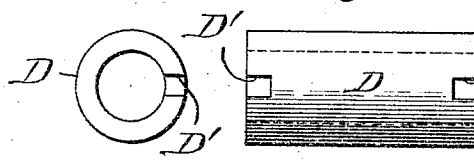
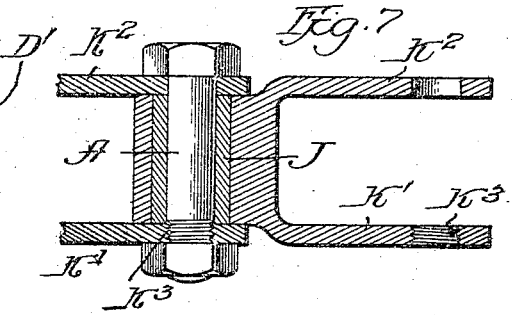
Witnesses:
Inventor
William Thomas James
By Paul Carpenter
Atty

UNITED STATES PATENT OFFICE.

WILLIAM T. JAMES, OF CHICAGO, ILLINOIS.

CHAIN.

1,235,321. Specification of Letters Patent. Patented July 31, 1917.

Application filed April 21, 1915. Serial No. 22,824.

*To all whom it may concern:*

Be it known that I, WILLIAM THOMAS JAMES, a citizen of the United States, and a resident of Chicago, in the county of Cook and State of Illinois, have invented certain new and useful Improvements in Chains, of which the following is a specification.

My present invention relates to improvements in chains of the flat link type, and has particular reference to that class of flat link chains in which the pintle is non-rotatably secured to one pair of side links or plates in order to minimize friction and wear.

The objects of the present invention are to provide improved means for locking the pintle to its supporting side links or plates; to provide means for adjusting the distance between the side plates supporting the pintle and securely fixing the latter in its adjusted position; to provide means whereby the pintle is non-rotatably adjustably secured to one pair of side plates, while at the same time a sleeve journaled on the pintle is also non-rotatably secured to the other pair of side plates.

One embodiment of my invention is illustrated in the accompanying drawings, in which:—

Figure 1 is a cross section through a joint of my improved chain having two separate side plates in each link with a sleeve surrounding the pintle;

Fig. 2 is a cross section through a joint of my improved chain having two separate side plates in each link, one of the side plates C' having a threaded hole; two hollow sleeves or bushings concentric with each other, a pintle with a threaded end to engage one of the link plates C', a lock nut to hold the pintle firmly in a non-rotative position in the outside link C', and a roller on the outside of the outer sleeve or bushing D;

Figs. 3 and 4 are end and side views, respectively, of the sleeve D with recesses D' in the ends to engage the projections B¹ in the link connecting holes;

Fig. 5 is a plan view of one of the inner side plates of the links showing projections to fit recesses in the sleeve or bushing;

Fig. 6 is a plan view of one of the outer side plates having a threaded hole for the threaded end of the pintle;

Fig. 7 is a cross section of a chain having a link in which the side plates are integral with the end of each link, one side plate of the link having a plain hole, while the connecting portion of the link has a hole for joint connection to similar links to form a chain.

Referring to the form of construction as indicated in the drawings, A is a pintle passing through the outer plates C, C', sleeve or bushing D, and also in the case of the form shown in Fig. 2 the sleeve or bushing E, and screwed into the threaded side plate C' to adjust the outer side plates C, C' of the chain links the proper distance apart. Preferably, as shown in Fig. 2, the nut A² is screwed firmly against the adjacent side plate C' on the pintle A to hold the outside side plates C, C' in a fixed relative position on the threaded pintle A, and to prevent the pintle from rotating in the outside side plates C, C'. The sleeve D is held in position by recesses D' engaging the projections B¹ in the inner plates B. In the form shown in Fig. 2 a bushing E is arranged between the pintle A and the bushing D. This bushing E is detachably, but non-rotatably connected to the outer side plate C by means of a projection C² adapted to enter a slot in the end of the bushing similar to the slots D' in the ends of the bushing D. The roller L (see Fig. 2) is outside of and fitted to revolve on the sleeve or bushing D. The side plates B and C' are shown in plan view separated from the other parts of the chain in Figs. 5 and 6. The threaded apertures C³ in the plate C' engage the threaded ends A' of the pintles so that the distance the plates C and C' are separated from each other can be adjusted by rotating the pintle relatively to the side plate C'. The one-piece link in Fig. 7 is provided in one side bar with a threaded hole K³; the bushing J is held in non-rotative position between the side bars by the threaded pintle A which passes through the side plates K² and K¹ and is screwed into threaded hole K³.

I claim as my invention:—

1. A chain comprising outer and inner pairs of side plates, a pintle having threaded engagement with one of said outer side plates, a lock nut engaging said pintle and said last-mentioned side plate, and a bushing rotatably mounted about said pintle between said outer side plates, said inner side plates having projections thereon adapted to engage detachably recesses on the ends of the said bushing whereby rotation of the latter relatively to said inner plates is prevented.

2. A chain comprising outer and inner pairs of side plates, a pintle having threaded engagement with one of said outer side plates, a lock nut engaging said pintle and said last-mentioned side plate, a bushing surrounding said pintle and non-rotatably attached at its ends to said outer pair of side plates, and a second bushing surrounding said first-mentioned bushing and non-rotatably attached at its ends to the inner pair of side plates.

3. A chain comprising outer and inner pairs of side plates, a pintle having threaded engagement with one of said outer side plates, and a lock nut engaging said pintle and said last-mentioned side plate, whereby relative rotation of the pintle and the outer side plates is prevented and the distance between the outer pair of side plates can be adjusted independently of the other parts of the chain.

4. A chain comprising a plurality of power transmission elements arranged in longitudinal series, a connecting pin threaded at one end, each of said power transmission elements being apertured adjacent one of its ends and one of the apertures being threaded for engagement with the threaded portion of the pin, and a lock nut adjacent the threaded aperture for locking said pin against movement relatively to said aperture, whereby said pin is normally held against all movement relatively to one of said transmission elements.

5. A chain comprising a series of pairs of parallel bars, a connecting pin for adjacent pairs of links and threaded at one end, the alternate pairs of the series being arranged intermediate the bars of the other alternate pairs, and all of the bars being apertured adjacent each end for the passage of the pins, one of the bars having one of its apertures threaded for engagement with the threaded portion of the pin, and a lock nut adjacent the threaded aperture for locking said pin against movement relative to said aperture.

6. A chain comprising a series of pairs of parallel bars, a connecting pin for adjacent pairs of links and threaded at one end, the alternate pairs of the series being arranged intermediate the bars of the other alternate pairs, and all of the bars being apertured adjacent each end for the passage of the pins, one of the bars having one of its apertures threaded for engagement with the threaded portion of the pin, and a lock nut adjacent the threaded aperture for locking said pin against movement relative to said aperture.

7. A chain comprising a plurality of power transmission elements arranged in longitudinal series, a connecting pin threaded at one end, each of said power transmission elements being apertured adjacent one of its ends, and one of the apertures being threaded for engagement with the threaded portion of the pin, means adjacent the threaded aperture for locking said pin against movement relatively to said aperture, whereby said pin is normally held against all movement relatively to one of said transmission elements, and a bushing between said pin and one of said power transmission elements.

8. A chain comprising a plurality of power transmission elements arranged in longitudinal series, a connecting pin threaded at one end, each of said power transmission elements being apertured adjacent one of its ends, and one of the apertures being threaded for engagement with the threaded portion of the pin, means adjacent the threaded aperture for locking said pin against movement relatively to said aperture, whereby said pin is normally held against all movement relatively to one of said transmission elements, and a plurality of bushings on said pin, one being arranged between said pin and one of said power transmission elements and the other being arranged between said pin and another of said power transmission elements.

9. A chain comprising a plurality of power transmission elements arranged in longitudinal series, a connecting pin threaded at one end, each of said power transmission elements being apertured adjacent one of its ends, and one of the apertures being threaded for engagement with the threaded portion of the pin, means adjacent the threaded aperture for locking said pin against movement relatively to said aperture, whereby said pin is normally held against all movement relatively to one of said transmission elements, and a plurality of bushings mounted on said pin, one being arranged between said pin and one of said power transmission elements to coact with such element and the other being arranged between said pin and another of said power transmission elements to coact with such element, and one of said bushings being immobile relatively to the power transmission element with which it coacts.

10. A chain comprising a plurality of power transmission elements arranged in longitudinal series, a connecting pin threaded at one end, each of said power transmission elements being apertured adjacent one of its ends, and one of the apertures being threaded for engagement with the threaded portion of the pin, means adjacent the threaded aperture for locking said pin against movement relatively to said aperture, whereby said pin is normally held against all movement relatively to one of said transmission elements, and a plurality of bushings mounted on said pin, one being arranged between said pin and one of said power transmission elements to coact with such element, and the other being arranged between said pin and another of said power transmission elements to coact with such element, each of said bushings being held immobile relative to the power transmission element with which it coacts, and said several bushings being movable relatively to each other.

In witness whereof I have hereunto signed my name in the presence of the two subscribing witnesses.

WM. T. JAMES.

Witnesses:
RIDSDALE ELLIS,
DONALD C. WILLIAMS.